(12) United States Patent
Friedrich

(10) Patent No.: US 8,552,837 B2
(45) Date of Patent: *Oct. 8, 2013

(54) DATA TRANSMISSION METHOD AND APPARATUS IN RFID AND REMOTE SENSOR SYSTEMS

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,222

(22) Filed: Mar. 4, 2011

(65) Prior Publication Data

US 2011/0148590 A1   Jun. 23, 2011

Related U.S. Application Data

(63) Continuation of application No. 11/088,202, filed on Mar. 24, 2005, now abandoned.

(30) Foreign Application Priority Data

Mar. 25, 2004   (DE) .......................... 10 2004 014 562

(51) Int. Cl.
  *G01S 13/74* (2006.01)
(52) U.S. Cl.
  USPC .......................... 340/10.1; 340/10.3; 340/10.5
(58) Field of Classification Search
  USPC ........................................................ 340/10.1
  See application file for complete search history.

(56) References Cited

U.S. PATENT DOCUMENTS

| | | | | |
|---|---|---|---|---|
| 5,157,615 A | * | 10/1992 | Brodegard et al. | 701/301 |
| 5,390,184 A | * | 2/1995 | Morris | 370/353 |
| 5,754,764 A | * | 5/1998 | Davis et al. | 709/200 |
| 6,389,476 B1 | * | 5/2002 | Olnowich | 709/233 |
| 7,102,488 B2 | | 9/2006 | Friedrich | |
| 7,193,504 B2 | | 3/2007 | Carrender et al. | |
| 2003/0012214 A1 | | 1/2003 | Munter | |
| 2003/0030568 A1 | | 2/2003 | Lastinger et al. | |
| 2003/0133435 A1 | * | 7/2003 | Friedrich | 370/349 |
| 2003/0137403 A1 | * | 7/2003 | Carrender et al. | 340/10.4 |
| 2005/0120186 A1 | * | 6/2005 | Happ et al. | 711/154 |

FOREIGN PATENT DOCUMENTS

| | | |
|---|---|---|
| DE | 101 38 217 A1 | 3/2003 |
| WO | 98/52168 A2 | 11/1998 |

OTHER PUBLICATIONS

Annala, et al.; *Palomar—an European Answer for Passive UHF RFID Applications?*; 7 pages, Sep. 3, 2001.

(Continued)

*Primary Examiner* — Brian Zimmerman
*Assistant Examiner* — Omer S Khan
(74) *Attorney, Agent, or Firm* — Baker Botts LLP

(57) ABSTRACT

A method and apparatus is provided for data transmission in RFID and remote sensor systems with at least one reader and a plurality of transponders or remote sensors being located in an electromagnetic field of the reader, in which a multipart return link header containing transmission parameters for the return link, such as timing or modulation references, is transmitted at the beginning of a return link transmission of useful data from a transponder or sensor to a reader. A relative time duration of individual subsymbols of the return link header is modified to select a data transfer mode from among a number of different data transfer modes. A combination of different return link transmission mechanisms is thereby possible, whereby these are mutually compatible and moreover are simple to realize in terms of circuitry and control engineering.

20 Claims, 2 Drawing Sheets

(56) References Cited

OTHER PUBLICATIONS

Annala, et al.; Atmel Wireless & Microcontrollers; *Palomar—a Passive Long Range Multiple Access High Frequency RFID System Considering the UHF Regulations in Europe*; 17 pages, Sep. 3, 2001.

*Automatic Identification—Radio Frequency Identification for Item Management; Part 6: Mode 3—Physical Layer, Anti Collision System and Protocols for Ultra High Frequency (UHF) Systems*; ISO-WD 18000-6 M3; 4 pages, Feb. 1, 2002.

\* cited by examiner

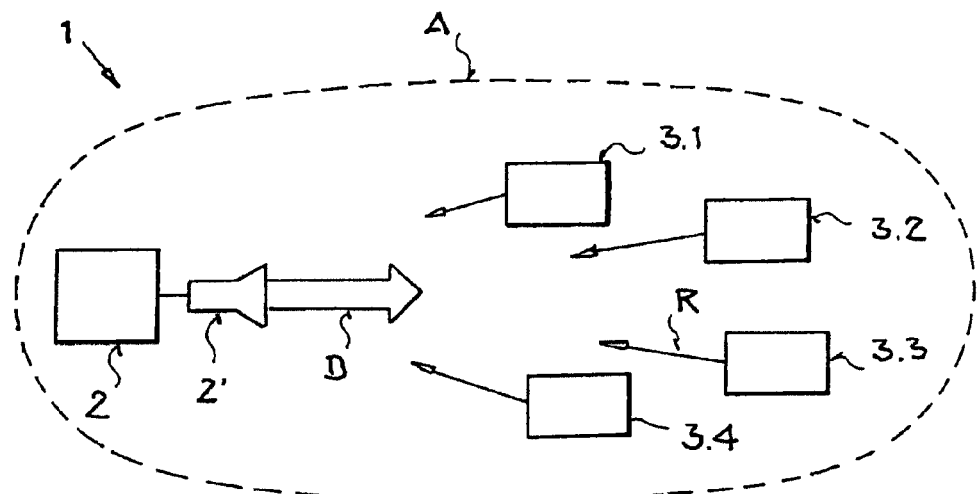
FIG. 1
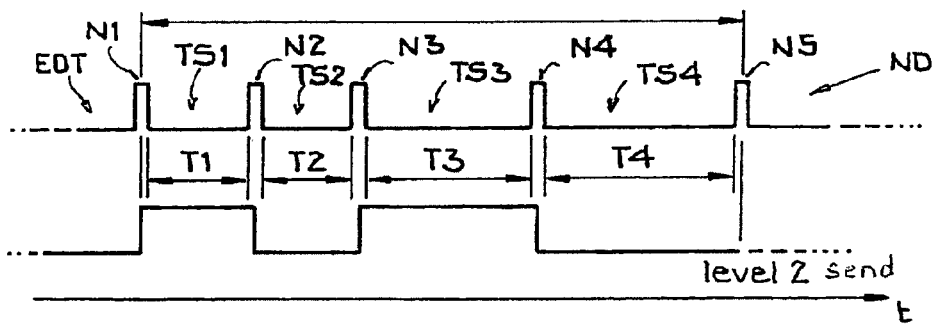
FIG. 2
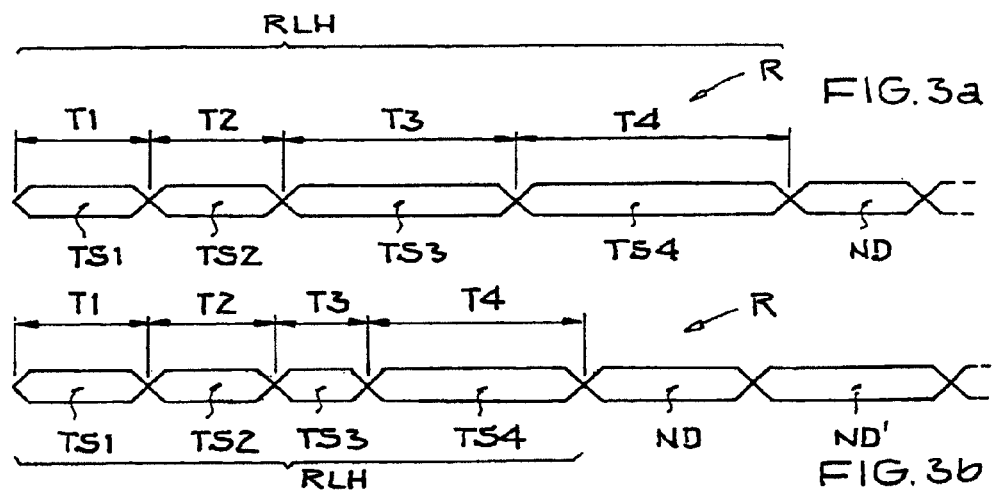
FIG. 3a
FIG. 3b

DATA TRANSMISSION METHOD AND APPARATUS IN RFID AND REMOTE SENSOR SYSTEMS

This application is a continuation, under 35 U.S.C. §120, of U.S. patent application Ser. No. 11/088,202, filed 24 Mar. 2005, which claims the benefit, under 35 U.S.C. §119(a), of German Patent Application No. DE 102004014562.8-35, filed 25 Mar. 2004.

BACKGROUND OF THE INVENTION

1. Field of the Invention

The present invention relates to a method and apparatus for data transmission in RFID and remote sensor systems including at least one reader and one or more transponders or remote sensors that are located in an electromagnetic field of the reader, in which a multipart return link header containing transmission parameters for the return link, such as modulation references, is transmitted at the beginning of a return link transmission of useful data from a transponder or sensor to a reader.

2. Description of the Background Art

Automatic identification methods, also called auto-ID, have been widely used in recent years in many service sectors, in acquisition and distribution logistics, in commerce, in production, and material flow systems. A goal of auto-ID is, for example, the thorough provision of information on persons, animals, objects, and products.

An example of such auto-ID systems are chip cards, which are widely used today, and in which a silicon memory chip by mechanical-galvanic contacting using a reader is provided with power, read out, and optionally also is reprogrammed. In this case, the acquisition device is routinely called a reader, regardless of whether data can only be read thereby or also rewritten.

In RFID systems, the data carrier, e.g., the transponder, can be supplied with power not only through galvanic contact but also contactless with the use of electromagnetic fields within the radio range (radio frequency: RF).

RFID systems typically have two basic components, namely, the transponder or sensor in the case of a remote sensor system, i.e., an application-specific integrated circuit (IC) with a coupling element, such as a dipole antenna for transmitting and receiving, and of the reader (also: base station), which typically has a high-frequency module (transmitter-receiver) and also a coupling element. The reader provides the transponder or sensor, which usually does not have its own power supply, with power and a clock signal. Data are transmitted both from the reader to the transponder (forward link) and also in the opposite direction (return link).

Such RFID systems, whose range is considerably greater than 1 m, work with electromagnetic waves in the UHF and microwave range. In this case, a backscattering method, typically called the backscatter principle because of its physical operating mode, is used predominantly, during the course of which a portion of the energy arriving at the transponder from the reader is reflected (backscattered) and in so doing can be modulated for data transmission. The IC receives via the coupling element a high frequency carrier, which it transmits by means of suitable modulation and backscattering devices partially back to the reader.

The RFID and remote sensor systems, outlined above and based on backscattering, generally have the disadvantage that the return link is very weak with respect to the power balance, primarily because of the free space attenuation both in the forward and return link. For this reason, attention must be focused especially in the design of such systems that a high signal-to-noise ratio (SNR) and thus a low bit error rate can be achieved.

A possible approach is the use of so-called "synchronous return links," in which the reader at certain time intervals sends synchronization tags (notch signals), which define a bit length in the return link. Thereby, additional expenditure for circuitry is usually necessary, which has an unfavorable effect on the price of such systems, for example, due to the use of special processors, such as digital signal processors (DSP). Several prior-art systems, such as the system developed within the scope of the Palomar project (Friedrich, U., Annala, A.: Palomar—a European answer for passive UHF RFID-applications. RFID Innovations 2001 Conference, London), are based on a synchronous return link.

Moreover, during use of synchronous return links an interfering effect on other readers in the vicinity due to the unfavorable power balance is disadvantageous. In this case, the difference between the sender and receiver can easily constitute 100 dB; i.e., only a level of about −70 dBm still occurs at the receiver. If in addition other sending or even modulating readers (production of notch signals) are in the vicinity, this circumstance has an especially interfering effect.

ISO standard 18000-6 FDIS, furthermore, describes systems with an asynchronous return link, in which a transponder or sensor transmits a "free" data stream without being affected by synchronization tags sent by the reader. Such asynchronous link mechanisms can be realized in UHF RFID systems more economically than the named synchronous link mechanisms, because, for example, normal processors can be used instead of DSPs. Nevertheless, in this connection, the SNR values as well are poorer in comparison with the synchronous solution, which can be acceptable, however, if the effect of reflections primarily in the near range, e.g., multipath propagation effects, is low.

Asynchronous methods possess advantages during use in RFID or remote sensor systems, which comprise a plurality of readers within a common range, because the noise contribution can be reduced by asynchronous operation. A synchronous return link is to be preferred, however, in cases of only a small number of readers or merely an insignificant effect for some other reasons.

Another inherent disadvantage of synchronous links is that suitable time bases on the transponder chip must be very accurate or suitably long synchronization character strings are required.

In the prior-art methods, it is regarded as particularly disadvantageous that these are defined in each case for a single link mechanism (cf. ISO 18000-6; Palomar). A possible workaround could be an appropriate expansion of the instruction set of known solutions related to the critical command and parameter fields. Nevertheless, the result of such an approach would greatly increase the amount decoding, which would have a negative effect on system efficiency.

SUMMARY OF THE INVENTION

It is therefore an object of the present invention to provide a method and apparatus so that a combination of different link mechanisms is possible, whereby these are to be mutually compatible and moreover simple to realize in terms of circuitry and control engineering, which is particularly important with respect to transponders or sensors to be able to operate at a correspondingly low cost in chip manufacture and installation.

An object of the invention is that a relative time duration of individual subsymbols of the return link header is modified to select a data transfer mode from a number of different data transfer modes.

Simple transfer of time information within a data structure present by default in this manner enables pre-selection of the transfer mode that is to be used, whereby the mentioned time information is not supplied by the carrier but by a modulation of the carrier, which leads to a notch signal. This in turn is then simple to detect. Only the transmission of a narrow band carrier is necessary to accomplish this on the part of the reader (base station). This in turn leads to a limitation of the reflection/multipath propagation effects in the near range (associated with a positive effect on SNR values in asynchronous transmission; see above) and permits a simple evaluation of the signals received from the transponder. This last property in turn has economic effects on the technical realization of the readers that are used.

In an example embodiment, either a synchronous or asynchronous data transfer mode is selected. By doing so, the time durations of two successive subsymbols of the return link header can be compared to select the data transfer mode.

The ISO Submission ISO 18000-6 M3, of Feb. 1, 2002 defined that upon data transmission from the reader to the transponder or sensor a multipart return link header, typically called a return link header, follows the last EOT symbol (end-of-transmission) of the forward link, which header typically has four subsymbols and, inter alia, serves to transfer the modulation references for the return link. The individual subsymbols are defined by the notch signals (field gaps, modulation dips). The actual useful data of the transponder or sensor thus follow the fourth subsymbol.

The following table provides an overview of the mandatory and optional features and agreements in the return link header according to ISO 18000-6:

TABLE

Mandatory and Optional Features and Agreements of the Return Link Header (according to ISO 18000-6).

| Function within the subsymbols | Comment |
| --- | --- |
| $1^{st}$ subsymbol, NRZ Modulation "on" | can be used by the reader to adapt the baud rate of the return link |
| $2^{nd}$ subsymbol, control element (timing reference) | 3phaseX control<br>FM0 control<br>Anticollision control symbol |
| $3^{rd}$ subsymbol, control element | defines whether the CRC value of the transponder UID is part of the return link |
| Modulation in the $3^{rd}$ subsymbol "on" | The type of modulation depends on the allowed types of modulation. If NRZI only is supported, then modulation is "on," otherwise it is controlled by the $2^{nd}$ subsymbol |
| $4^{th}$ subsymbol represents the time reference for EOT detection in (synchronous) return link | Modulation like "0" |

The position and length of the aforementioned CRC data normally depends on the actual UID (unique identification) mechanism in the forward and/or return link. Because this in turn varies greatly according to the application, the functionality of the third subsymbol in the table according to ISO 18000-6 remained free and can be used according to the invention to make a selection with respect to the type of return link to be used. In an embodiment of the present invention, for selecting an asynchronous data transfer mode, the later subsymbol, here the functionally "free" third subsymbol of the return link header, is modified with regard to standard length, e.g., is shortened, so that its time duration differs from that of the earlier second subsymbol.

In addition, during receipt of a modified later subsymbol the state of a memory element of the transponder or sensor can be changed, to indicate permanently the receipt of the modified symbol (in its property as a control signal) and a release of the asynchronous data transfer mode.

Further, the possibility of error correction can be provided in that the fourth subsymbol represents, in the synchronous case, a minimal length of the EOT signal. Thereby, for example, by setting a minimal (time) EOT threshold, it can be defined that no notch signal has to occur before the second (useful data) bit is reached in the asynchronous data stream. If, nevertheless, the third subsymbol is erroneously received by the transponder or sensor or incorrectly transmitted by the reader, the transponders or sensors assume that they are in the asynchronous mode, whereas the reader proceeds from a synchronous return link; thus the transponder or sensor within the scope of the method of the invention receives a synchronization signal (notch signal) of the reader, before a time corresponding to the minimal EOT threshold has passed; i.e., the transponder or sensor receives a notch signal in the middle of a symbol of its useful data transmission. For this case, in which at time intervals the reader sends notch signals for the synchronization of the data transmission through the transponder or sensor, a feature of the method of the invention provides that the transponder or sensor upon receipt of a notch signal during its useful data transmission to the reader returns to the synchronous mode. Thereby, a set memory element that has a previously modified state can be reset.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a schematic illustration of an RFID/sensor system, according to an embodiment of the present invention;

FIG. 2 is a schematic illustration of a return link header according to ISO 18000-6;

FIG. 3a shows schematically a return link header and subsequent useful data in a synchronous return link;

FIG. 3b shows schematically the return link header and subsequent useful data in an asynchronous return link.

DETAILED DESCRIPTION

Figure 4:
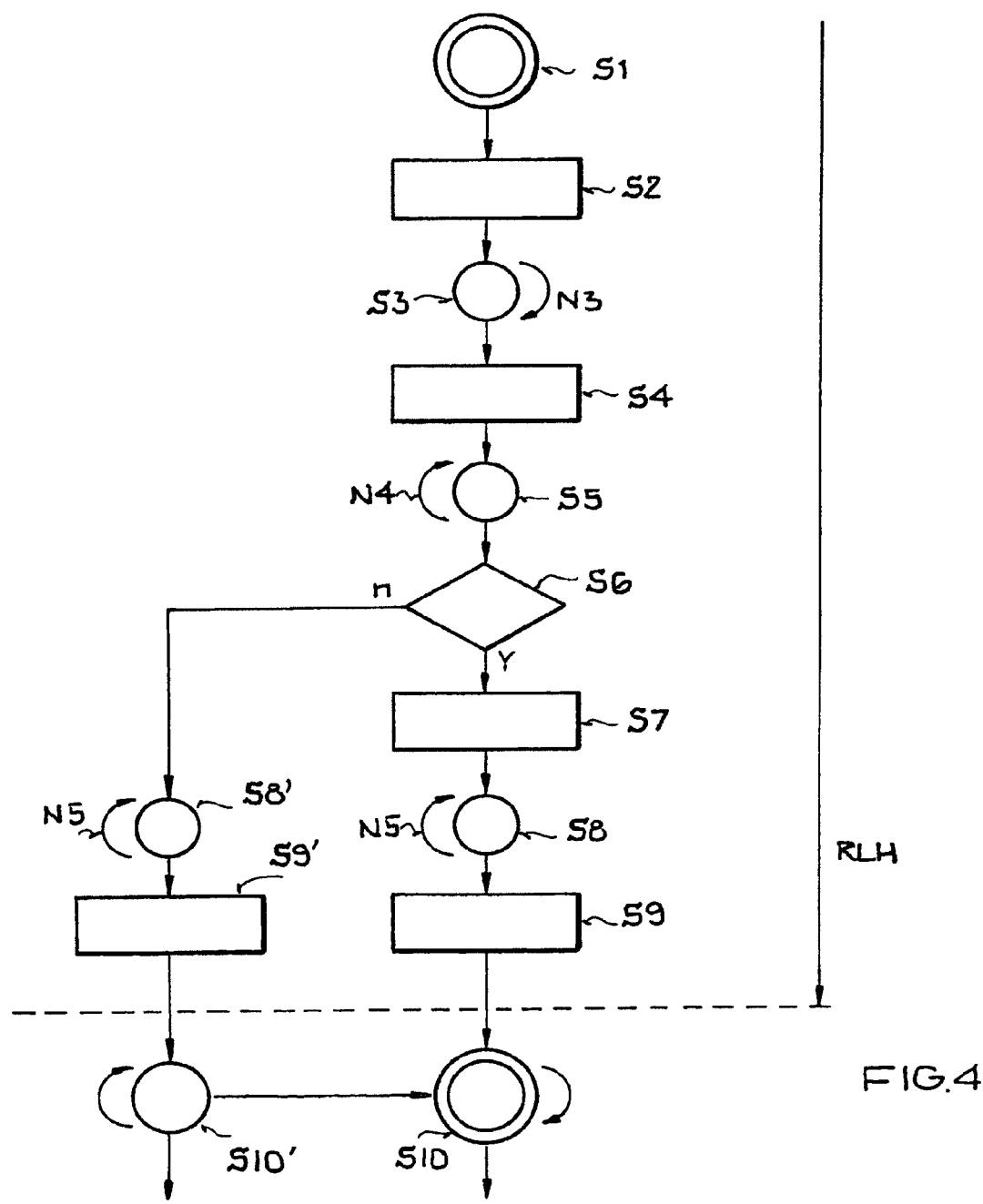
FIG. 4 is a flow chart according to an embodiment of the present invention.

FIG. 1 shows a system, e.g., an RFID system 1, that can include a reader 2 having a suitable transmitter and receiver 2', such as a dipole antenna, and one or more transponders 3.1-3.4, which together are located within a response range A of the reader 2. Although only transponders are discussed in the following description, the method of the invention can also be used in remote sensor systems, in combined sensor-transponder systems, etc.

A data stream D, which is sent by the reader 2 or the transmitter 2' is received substantially simultaneously by all of the transponders 3.1-3.4. The data transmission from the reader 2 to a transponder 3.1-3.4 is described below as a forward link. The transponders 3.1-3.4 respond at least to a completed data transmission from the reader 2 via the return links R (return link), whereby some of the energy coming in from the reader 2 together with the data D at the transponders 3.1-3.4 is reflected (backscattered) and thereby is optionally modulated for data transmission from the transponders 3.1-3.4 to the reader 2. During use of the system 1, which can be capable of full duplex, a data transmission to the reader 2 can also occur even during the forward link.

Actual useful data of the return link are preceded by a return link header, which defines the specific transmission parameters of the return links R. FIG. 2 shows first in the upper part schematically the basic construction of the return link header (RLH) according to ISO 18000-6 M3, p. 50. Shown in a lower portion of FIG. 2 is a logical signal "level2send" that is to be transmitted.

The RLH can have four subsymbols TS1-TS4, which are defined by a time sequence of notch signals Ni, whereby i= 1, . . . , 5. The arrow t in FIG. 2 indicates the time course of the notch signal sequence. Here, in the left portion of FIG. 2 a last EOT symbol (end-of-transmission) of the forward link is recognizable, and in the right hand portion of FIG. 2, a first useful data field ND of the return link R, is shown.

The time duration T1 of the first subsymbol TS1 is used for a main timing adjustment, which, due to the broad covered baud rate range between 1 and 80 kbit/s, is necessary, on the one hand, to reduce the activity in slow protocols (current saving) and, on the other hand, to control the accuracy of the modulation switching. A duration T2 of the second subsymbol TS2 is a timing reference for a modulation of the return link data transmission to the reader 2. A third subsymbol TS3, which is free according to ISO 18000-6, is used, according to an embodiment of the invention, as a "switch" to switch between synchronous or asynchronous data transmission in the return link R, as is explained in greater detail below. A subsymbol T4 is a reference time for an EOF detection (end-of-frame) in the return link, e.g., to indicate the end of a data block for the synchronous link.

FIGS. 3*a* and 3*b* each show excerpts from a start of a return link R from the transponder to the reader. Each of the subsymbols TS1-TS4 of the header RLH with their specific time durations T1-T4 and the useful data ND, ND', following the header RLH, can be recognized. The switching between a synchronous, notch-triggered return link R (FIG. 3*a*) and an asynchronous, free running return link R (FIG. 3*b*) is made by the time correlation between the second subsymbol TS2 and the third subsymbol TS3 of the header RLH. A relative time duration of individual subsymbols of the return link header can be changed to select a data transfer mode from a number of different data transfer modes. If, for example, a duration T2 of the second subsymbol TS2 is shorter than a duration T3 of the third subsymbol TS3, the synchronous transfer mode is selected (FIG. 3*a*). In the opposite case (FIG. 3*b*), the asynchronous transfer mode is selected. Accordingly, time durations of two successive subsymbols of the return link header are compared. Because the second subsymbol TS2, as mentioned above, contains important timing information with respect to signal modulation in the return link R, this remains unchanged in each case, and to select the asynchronous data transfer mode, only the later third subsymbol TS3 is shortened relative to a standard length shown in FIG. 3*a* so that its time duration T3 is shorter than the duration T2 of the earlier second subsymbol TS2, i.e., T2>T3.

Based on the standard length T3>T2 of the third subsymbol TS3 (cf. FIG. 3*a*), a synchronous return link R is preset by default. However, if the transponder receives a third subsymbol TS3 in which T3<T2, then a memory element (not shown) of the transponder is set to release the asynchronous transfer mode, i.e., it undergoes a change in state.

In the asynchronous return link mode, the transponder transmits its data once to the reader (e.g., autodecrement of a memory address either up to full memory or up to a block (32 bit) or page break (128 bit)) and is then mute in the expectation of a new notch signal, which is interpreted as the beginning of a new forward link and at the same time causes a resetting of the aforementioned memory element, so that the default synchronous mode is preselected again. A normally present timeout control cycle is turned off in the asynchronous mode.

FIG. 4 shows a flow chart of the return link header RLH (top part of FIG. 4 up to dashed line), according to an embodiment of the invention. After the start of the header RLH in step S1 (notch signals N1, N2; receipt of the first subsymbol TS1; cf. FIGS. 2, 3*a*, and 3*b*), in step S2 an internal clock of the transponder is first switched to a "slow" operating mode. The clock signal or clock system is set with the first subsymbol TS1, either by further reducing a frequency of an oscillator, normally present in UHF applications, of the transponder or doubling the oscillator frequency. This occurs as a function of the first time measurement (T1). Next, the transponder in step S3 waits for a time T2 for the next notch signal N3 (FIG. 2). The time T2 is determined and saved in the following step S4. At substantially the same time, the internal clock signal can be set. Then the transponder waits in step S5 for a time T3 for the following notch signal N4 (FIG. 2).

The two times T2, T3 are compared in the next step S6. In step S6 a query is made whether T3>T2, as is assumed by default (FIG. 3*a*), i.e., whether transmission occurs via a synchronous return link. If the answer to query S6 is yes (y), the modulation reference time is set (step S7); next for time T4 the last notch signal N5 of the header RLH is awaited (step S8) and in step S9 the EOT time is set and the data modulation is begun. Step S10, which is below the dashed line, symbolizes the synchronous return link R up to receipt of an EOT symbol.

If the answer to the query in step S6 is no (n), the transponder waits for the final notch signal N5 (step S8') and then in step S9' begins an asynchronous data modulation. Step S10', which is shown below the dashed line, symbolizes the asynchronous return link R until the receipt of a certain end condition.

According to an embodiment of the invention, the mode selection is backwards compatible. This is symbolized in FIG. 4 by an arrow between the asynchronous return link S10' and the synchronous return link S10. If the third subsymbol TS3 was erroneously received by the transponder or erroneously transmitted by the reader, the relevant transponder according to the above, thus receives a synchronization signal (notch) from the reader before a minimal EOT time threshold is reached. The aforementioned memory element, which indicates an active asynchronous transfer mode, can be reset by this means, without affecting the transmission of the first useful data bit ND (cf. FIG. 3*a, b*) after transmission of the header, RLH. If therefore the reader in an actual synchronous return link data transmission at time intervals sends notch signals Ni for synchronizing the data transmission through the transponder and the transponder receives such a notch signal Ni during its useful data transmission to the reader, particularly due to an erroneous shortening of the third subsymbol TS3, the transponder can return to the synchronous mode.

The method and apparatus of the invention, described in detail above, has critical advantages during use in RFID or remote sensor systems, which, has, for example, a plurality of readers within a common range. In such systems, the noise contribution can be reduced by switching to asynchronous operation, which results in an improvement in the quality of the return link. In cases of only a small number of readers or of only an insignificant effect for other reasons, however, a synchronous return link is preferred. This is possible due to the switchability according to the invention between the two link mechanisms.

Another advantage of the method of the invention results in relation to (called upon) anticollision procedures, when there are several transponder or sensors in the field: To switch transponders from a stand-by or power-down state to an active state, wake-up commands are normally issued, to which the transponder must respond within a specific time window. If an EOF symbol occurs within the named time window, an anticollision procedure begins automatically thereby. According to the synchronous/asynchronous decision made according to the invention, command sequences for anticollision can now be accelerated henceforth by using an allocated, predetermined anticollision method depending on the selected synchronous or asynchronous return link, for example, Aloha (a transponder-controlled, stochastic TDMA method; time domain multiple access—time multiplex; see Finkenzeller, RFID-Handbuch [RFID Handbook], 3rd ed., pp. 210ff) in the case of asynchronous transmission.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A method comprising:
receiving, within an electromagnetic field of a reader, a transmission from the reader;
transmitting to the reader in response to receiving the transmission from the reader a return link comprising a return link header, the return link header containing transmission parameters comprising plurality of subsymbols each having an associated time duration; and
modifying the associated time duration of a first subsymbol of the plurality of subsymbols to select a data transfer mode for transmitting data to the reader, the selected data transfer mode being determined based on a comparison of the associated time duration of the first symbol with an associated time duration of a second subsymbol of the plurality of subsymbols.

2. The method of claim 1, wherein:
the associated time duration of the first subsymbol is modified such that it is shorter than the associated time duration of the second subsymbol; and
the selected data transfer mode comprises an asynchronous data transfer mode.

3. The method of claim 1, wherein:
the selected data transfer mode comprises an asynchronous data transfer mode; and
the method further comprises:
receiving, in the asynchronous data transfer mode, notch signals at predetermined time intervals for synchronizing a data transmission to the reader; and
switching to a synchronous data transfer mode upon receipt of a notch signal.

4. The method of claim 1, wherein:
the selected data transfer mode comprises an asynchronous data transfer mode; and
the method further comprises switching from the asynchronous data transfer mode to the synchronous data transfer mode by resetting a memory element.

5. The method of claim 1, wherein the data transfer mode is selected between synchronous and asynchronous data transfer modes.

6. A non-transitory computer-readable medium comprising logic that when executed is operable to perform operations comprising:
receiving, within an electromagnetic field of a reader, a transmission from the reader;
transmitting to the reader in response to receiving the transmission from the reader a return link comprising a return link header, the return link header containing transmission parameters comprising plurality of subsymbols each having an associated time duration; and
modifying the associated time duration of a first subsymbol of the plurality of subsymbols to select a data transfer mode for transmitting data to the reader, the selected data transfer mode being determined based on a comparison of the associated time duration of the first symbol with an associated time duration of a second subsymbol of the plurality of subsymbols.

7. The medium of claim 6, wherein:
the associated time duration of the first subsymbol is modified such that it is shorter than the associated time duration of the second subsymbol; and
the selected data transfer mode comprises an asynchronous data transfer mode.

8. The medium of claim 6, wherein:
the selected data transfer mode comprises an asynchronous data transfer mode; and
the operations further comprise:
receiving, in the asynchronous data transfer mode, notch signals at predetermined time intervals for synchronizing a data transmission to the reader; and
switching to a synchronous data transfer mode upon receipt of a notch signal.

9. The medium of claim 6, wherein:
the selected data transfer mode comprises an asynchronous data transfer mode; and
the operations further comprise switching from the asynchronous data transfer mode to the synchronous data transfer mode by resetting a memory element.

10. The medium of claim 6, wherein the data transfer mode is selected between synchronous and asynchronous data transfer modes.

11. An apparatus comprising:
a transponder comprising an antenna; and
a non-transitory computer-readable medium comprising logic that when executed is operable to perform operations comprising:
receiving, within an electromagnetic field of a reader, a transmission from the reader;
transmitting to the reader in response to receiving the transmission from the reader a return link comprising a return link header, the return link header containing transmission parameters comprising plurality of subsymbols each having an associated time duration; and
modifying the associated time duration of a first subsymbol of the plurality of subsymbols to select a data transfer mode for transmitting data to the reader, the selected data transfer mode being determined based on a comparison of the associated time duration of the first symbol with an associated time duration of a second subsymbol of the plurality of subsymbols.

12. The apparatus of claim 11, wherein:
the associated time duration of the first subsymbol is modified such that it is shorter than the associated time duration of the second subsymbol; and
the selected data transfer mode comprises an asynchronous data transfer mode.

13. The apparatus of claim 11, wherein:
the selected data transfer mode comprises an asynchronous data transfer mode; and
the operations further comprise:
    receiving, in the asynchronous data transfer mode, notch signals at predetermined time intervals for synchronizing a data transmission to the reader; and
    switching to a synchronous data transfer mode upon receipt of a notch signal.

14. The apparatus of claim 11 wherein:
the selected data transfer mode comprises an asynchronous data transfer mode; and
the operations further comprise switching from the asynchronous data transfer mode to the synchronous data transfer mode by resetting a memory element.

15. The method of claim 1, wherein:
the plurality of subsymbols of the return link header comprises a set of four subsymbols; and
the first subsymbol is located subsequent to the first subsymbol in the return link header.

16. The method of claim 1, wherein the plurality of subsymbols of the return link header comprises:
the first subsymbol for selecting the data transfer mode for transmitting data to the reader;
the second subsymbol comprising a timing reference;
a third subsymbol for adjusting main timing; and
a fourth subsymbol comprising a reference time for an end of frame.

17. The medium of claim 6, wherein:
the plurality of subsymbols of the return link header comprises a set of four subsymbols; and
the first subsymbol is located subsequent to the first subsymbol in the return link header.

18. The medium of claim 6, wherein the plurality of subsymbols of the return link header comprises:
the first subsymbol for selecting the data transfer mode for transmitting data to the reader;
the second subsymbol comprising a timing reference;
a third subsymbol for adjusting main timing; and
a fourth subsymbol comprising a reference time for an end of frame.

19. The apparatus of claim 11, wherein:
the plurality of subsymbols of the return link header comprises a set of four subsymbols; and
the first subsymbol is located subsequent to the first subsymbol in the return link header.

20. The apparatus of claim 11, wherein the plurality of subsymbols of the return link header comprises:
the first subsymbol for selecting the data transfer mode for transmitting data to the reader;
the second subsymbol comprising a timing reference;
a third subsymbol for adjusting main timing; and
a fourth subsymbol comprising a reference time for an end of frame.

\* \* \* \* \*